United States Patent
Wang

(10) Patent No.: US 9,664,970 B2
(45) Date of Patent: May 30, 2017

(54) LCD PANEL WHEREIN TFT UNITS TO MITIGATE GATE SIGNAL DELAY ARE DISPOSED OPPOSITE TO THE GATE DRIVER AND CONNECTED TO INDIVIDUAL GATE LINES

(71) Applicants: BOE TECHNOLOGY GROUP CO., LTD., Beijing (CN); BEIJING BOE DISPLAY TECHNOLOGY CO., LTD., Beijing (CN)

(72) Inventor: Zheng Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 148 days.

(21) Appl. No.: 14/422,540

(22) PCT Filed: Oct. 25, 2013

(86) PCT No.: PCT/CN2013/085991
§ 371 (c)(1),
(2) Date: Feb. 19, 2015

(87) PCT Pub. No.: WO2014/190664
PCT Pub. Date: Dec. 4, 2014

(65) Prior Publication Data
US 2015/0234246 A1     Aug. 20, 2015

(30) Foreign Application Priority Data

May 31, 2013 (CN) .......................... 2013 1 0215463

(51) Int. Cl.
*G02F 1/1368*    (2006.01)
*G02F 1/133*    (2006.01)
(Continued)

(52) U.S. Cl.
CPC ...... *G02F 1/136286* (2013.01); *G02F 1/1368* (2013.01); *G02F 1/13306* (2013.01); *G09G 3/3677* (2013.01); *G09G 2320/0223* (2013.01)

(58) Field of Classification Search
CPC .. G09G 3/3266; G09G 3/3674; G09G 3/3677; G09G 2310/0267;
(Continued)

(56) References Cited

U.S. PATENT DOCUMENTS 8,217,926 B2 * 7/2012 Meng .................. G09G 3/3677
                                                 345/205
8,773,413 B2 * 7/2014 Zhou ................... G09G 3/3674
                                                 345/100
(Continued)

FOREIGN PATENT DOCUMENTS

CN        1959799 A     5/2007
CN    201000518 Y     1/2008
(Continued)

OTHER PUBLICATIONS

International Preliminary Report on Patentability issued Dec. 1, 2015; PCT/CN2013/085991.
(Continued)

*Primary Examiner* — Chanh Nguyen
*Assistant Examiner* — Navin Lingaraju
(74) *Attorney, Agent, or Firm* — Ladas & Parry LLP

(57) ABSTRACT

Disclosed is an LCD panel. The LCD panel comprises a display area (13), and a first signal line, a second signal line . . . an $N^{th}$ signal line which are connected to the display area (13), wherein the LCD panel further comprises a TFT area (14). One side of the display area (13) is provided with a first signal output port, a second signal output port . . . an $N^{th}$ signal output port. The TFT area (13) comprises a first TFT unit, a second TFT unit . . . an $(N+1)^{th}$ TFT unit; and (Continued)

both the first TFT unit and the $(N+1)^{th}$ TFT unit comprise one TFT, and the second TFT unit to the $N^{th}$ TFT unit respectively comprise two TFTs, i.e. a first TFT and a second TFT. Further disclosed is a display device. By adopting the LCD panel, a circuit of a gate driver can be made to be more simple and occupy less space on the basis of not changing gate signal characteristics.

4 Claims, 2 Drawing Sheets

(51) Int. Cl.
    *G02F 1/1362* (2006.01)
    *G09G 3/36* (2006.01)
(58) Field of Classification Search
    CPC ... G09G 2310/0281; G09G 2310/0283; G09G 2310/0286; G09G 2320/0223; G09G 2300/0408
    See application file for complete search history.

(56) References Cited

U.S. PATENT DOCUMENTS

| | | | | |
|---|---|---|---|---|
| 2002/0011982 A1* | 1/2002 | Takeuchi | ............ | G09G 3/3677 345/92 |
| 2002/0084968 A1* | 7/2002 | Park | ............ | G09G 3/3648 345/92 |
| 2007/0171172 A1* | 7/2007 | Chang | ............ | G09G 3/3648 345/98 |
| 2007/0192659 A1* | 8/2007 | Kang | ............ | G11C 19/184 714/726 |
| 2007/0197019 A1 | 8/2007 | Kang et al. | | |
| 2008/0074379 A1* | 3/2008 | Kim | ............ | G09G 3/3677 345/99 |
| 2008/0122875 A1* | 5/2008 | Qi | ............ | G09G 3/3677 345/690 |
| 2009/0096735 A1* | 4/2009 | Meng | ............ | G09G 3/3677 345/89 |
| 2009/0185093 A1* | 7/2009 | Gao | ............ | G02F 1/1345 349/42 |
| 2010/0245312 A1* | 9/2010 | Yamazaki | ............ | G09G 3/3677 345/208 |
| 2011/0018846 A1* | 1/2011 | Hu | ............ | G02F 1/136286 345/204 |
| 2011/0267326 A1* | 11/2011 | Kim | ............ | G09G 3/3677 345/211 |
| 2012/0050633 A1 | 3/2012 | Chen et al. | | |
| 2012/0242646 A1 | 9/2012 | Yamato | | |
| 2014/0240302 A1* | 8/2014 | Chen | ............ | G09G 3/3614 345/212 |
| 2016/0358570 A1* | 12/2016 | Wang | ............ | G09G 3/3677 |

FOREIGN PATENT DOCUMENTS

| | | |
|---|---|---|
| CN | 101510416 A | 8/2009 |
| CN | 201828742 U | 5/2011 |
| CN | 102290040 A | 12/2011 |
| CN | 102652334 A | 8/2012 |
| CN | 201828742 U | 10/2013 |
| KR | 20070080053 A | 8/2007 |

OTHER PUBLICATIONS

International Search Report mailed Mar. 6, 2014; PCT/CN2013/085991.

* cited by examiner

LCD PANEL WHEREIN TFT UNITS TO MITIGATE GATE SIGNAL DELAY ARE DISPOSED OPPOSITE TO THE GATE DRIVER AND CONNECTED TO INDIVIDUAL GATE LINES

TECHNICAL FIELD

Embodiments of the present disclosure relate to a liquid crystal display (LCD) panel and a method for manufacturing the same.

BACKGROUND

In the current technology, a gate drive on array (GOA) technology is commonly used in the design of a liquid crystal display (LCD), and in the GOA technology, a gate driver is integrated on an array substrate to form a GOA unit. Generally, in an liquid crystal display panel which is larger than 19 inches, gate drivers usually adopts a both-side driven design, namely, the gate drivers are disposed on both sides of the LCD panel. The reason is that: a large-sized liquid crystal display panel can bring a big load (such as a large resistance and a parasitic capacitance) due to large size, long wiring, and high resolution, this can cause a gate signal delay (RC delay), and the gate signal delay can further have bad effects on the charging of pixel electrodes, such as insufficient charging of the pixel electrodes, poor image uniformity; therefore, in order to solve the above-mentioned problems, for a liquid crystal display panel which is larger than 19 inches, in the current technology, the both-side driven method is commonly used, namely, the gate drivers are disposed on both sides of the liquid crystal display panel, and in this way, the bad effect caused by the gate signal delay (RC delay) can be weakened.

With respect to the GOA technology, the both-side driven design is to design two identical groups of integrated circuits on both ends of gate signal lines, namely, the gate drivers are disposed on both sides of a liquid crystal display panel. As shown in FIG. 1, for example, a GOA region includes a first GOA unit 1, a second GOA unit 2, a third GOA unit 3 and a fourth GOA unit 4, and accordingly four signal lines are provided, i.e., a first signal line 5, a second signal line 6, a third signal line 7 and a fourth signal line 8, and four signal output ports are provided, i.e., a first signal output port 9, a second signal output port 10, a third signal output port 11 and a fourth signal output port 12. It can be seen from FIG. 1 that GOA regions (the GOA regions each are provided with the gate drivers) are located on both sides of a display area 13.

Herein, the gate drivers in the GOA regions are used for shifting and transmitting gate signals. However, the both-side driven design causes the gate drivers to occupy a larger space, reduces the area of the display area, and lessens the space for a peripheral design of the LCD panel.

SUMMARY

An embodiment of the present disclosure provides an LCD panel. The LCD panel includes a display area, and a first signal line, a second signal line through an $N^{th}$ signal line which are connected to the display area; the LCD panel further includes a thin film transistor (TFT) area; a first signal output port, a second signal output port through an $N^{th}$ signal output port are disposed on a side of the display area; the TFT area includes a first TFT unit, a second TFT unit through an $(N+1)^{th}$ TFT unit; and each of the first TFT unit and the $(N+1)^{th}$ TFT unit includes one TFT, and each of the second TFT unit through an $N^{th}$ TFT unit includes two TFTs, i.e., a first TFT and a second TFT. In the first TFT unit, a gate electrode of the TFT is connected to the first signal output port, and a source electrode of the TFT is connected to the first signal line; in the second TFT unit, a gate electrode of the first TFT is connected to the first signal output port, a source electrode of the first TFT is connected to the second signal line, and a drain electrode of the first TFT is connected to the second signal output port; in the second TFT unit, a gate electrode of the second TFT is connected to the second signal output port, a source electrode of the second TFT is connected to the first signal line, and a drain electrode of the second TFT is connected to the first signal output port; in the $N^{th}$ TFT unit, a gate electrode of the first TFT is connected to an $(N-1)^{th}$ signal output port, a source electrode of the first TFT is connected to the $N^{th}$ signal line, and a drain electrode of the first TFT is connected to the $N^{th}$ signal output port; in the $N^{th}$ TFT unit, a gate electrode of the second TFT is connected to the $N^{th}$ signal output port, a source electrode of the second TFT is connected to the $(N-1)^{th}$ signal line, and a drain electrode of the second TFT is connected to the $(N-1)^{th}$ signal output port; and in the $(N+1)^{th}$ TFT unit, a gate electrode of the TFT is connected to the $N^{th}$ signal output port, and a source electrode of the TFT is connected to the $N^{th}$ signal line.

The LCD panel further includes a GOA region including a first GOA unit, a second GOA unit through an $N^{th}$ GOA unit; the first GOA unit is connected to the first signal line, and is connected to the first signal output port through the display area; the second GOA unit is connected to the second signal line, and is connected to the second signal output port through the display area; and the $N^{th}$ GOA unit is connected to the $N^{th}$ signal line, and is connected to the $N^{th}$ signal output port through the display area.

An embodiment of the present disclosure further provides a display device including the above-mentioned LCD panel.

REFERENCE SIGNS

Figure 1:
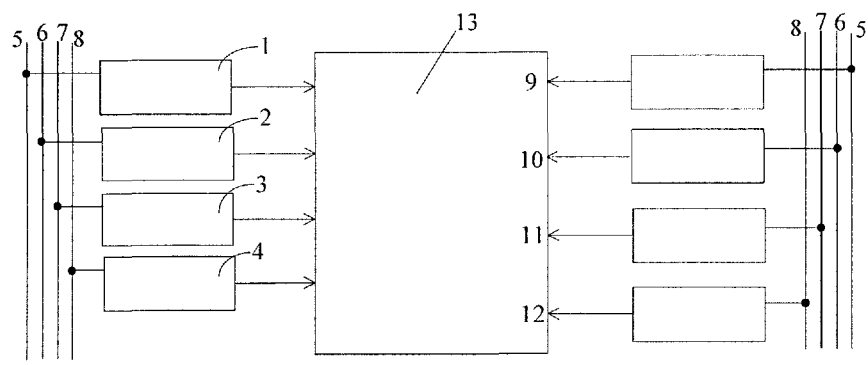
FIG. 1 is a schematic structure view of an LCD panel in a current technology.

1: first GOA unit; 2: second GOA unit; 3: third GOA unit; 4: fourth GOA unit; 5: first signal line; 6: second signal line; 7: third signal line; 8: fourth signal line; 9: first signal output port; 10: second signal output port; 11: third signal output port; 12: fourth signal output port; 13: display area; 14: first TFT unit; 15: second TFT unit; 15-1: first TFT in second TFT unit; 15-2: second TFT in second TFT unit; 16: third TFT unit; 16-1: first TFT in third TFT unit; 16-2: second TFT in third TFT unit; 17: fourth TFT unit; 17-1: first TFT in fourth TFT unit; 17-2: second TFT in fourth TFT unit; 18: fifth TFT unit.

DETAILED DESCRIPTION

In the following, implementations of the present disclosure will be described in detail in connection with specific embodiments and the accompanying drawings.

An LCD panel is provided. The LCD panel includes a display area, and a first signal line and a second signal line to an $N^{th}$ signal line which are connected to the display area, the LCD panel further includes a TFT area; a first signal output port and a second signal output port to an $N^{th}$ signal output port are disposed on a side of the display area; the TFT area includes a first TFT unit and a second TFT unit to an $(N+1)^{th}$ TFT unit; and each of the first TFT unit and the $(N+1)^{th}$ TFT unit includes one TFT, and each of the second TFT unit through an $N^{th}$ TFT unit includes two TFTs, i.e., a first TFT and a second TFT.

In the first TFT unit, a gate electrode of the TFT is connected to the first signal output port, and a source electrode of the TFT is connected to the first signal line.

In the second TFT unit, a gate electrode of the first TFT is connected to the first signal output port, a source electrode of the first TFT is connected to the second signal line, and a drain electrode of the first TFT is connected to the second signal output port; and in the second TFT unit, a gate electrode of the second TFT is connected to the second signal output port, a source electrode of the second TFT is connected to the first signal line, and a drain electrode of the second TFT is connected to the first signal output port.

In the $N^{th}$ TFT unit, a gate electrode of the first TFT is connected to the $(N-1)^{th}$ signal output port, a source electrode of the first TFT is connected to the $N^{th}$ signal line, and a drain electrode of the first TFT is connected to the $N^{th}$ signal output port; and in the $N^{th}$ TFT unit, a gate electrode of the second TFT is connected to the $N^{th}$ signal output port, a source electrode of the second TFT is connected to the $(N-1)^{th}$ signal line, and a drain electrode of the second TFT is connected to the $(N-1)^{th}$ signal output port.

In the $(N+1)^{th}$ TFT unit, a gate electrode of the TFT is connected to the $N^{th}$ signal output port, and a source electrode of the TFT is connected to the $N^{th}$ signal line.

Further, the LCD panel includes a GOA region including a first GOA unit and a second GOA unit to an $N^{th}$ GOA unit.

The first GOA unit is connected to the first signal line, and is connected to the first signal output port through the display area.

The second GOA unit is connected to the second signal line, and is connected to the second signal output port through the display area.

The $N^{th}$ GOA unit is connected to the $N^{th}$ signal line, and is connected to the $N^{th}$ signal output port through the display area.

An embodiment of the present disclosure further provides a display device including the above-mentioned LCD panel.

Embodiment 1

Generally, a GOA region includes four GOA units, six GOA units, or eight GOA units, and the number of the corresponding signal lines is four, six, or eight. Taking the GOA region including four GOA units as an example, a structure of an LCD panel is further described.

Figure 2:
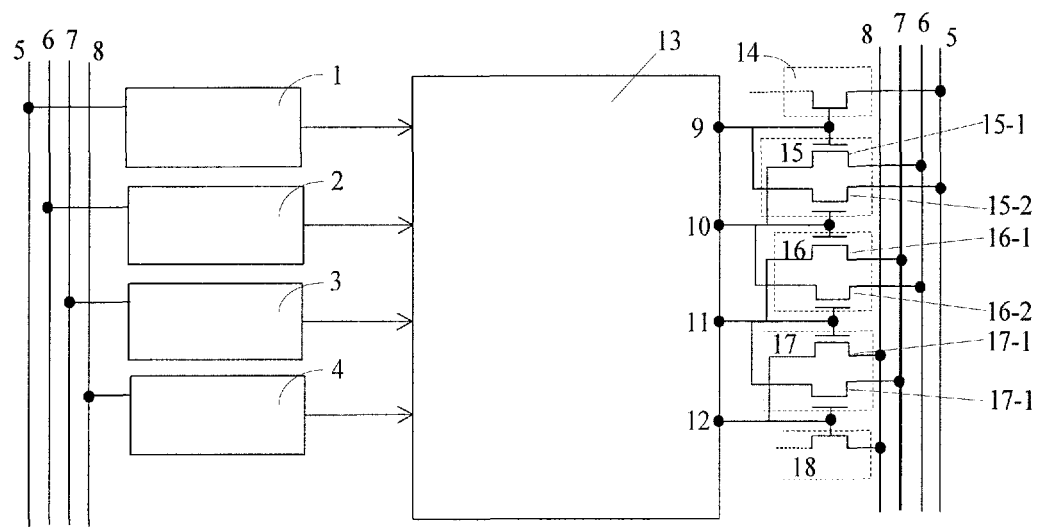
FIG. 2 is a schematic structure view of an LCD panel in an embodiment 1.

FIG. 2 is a schematic structure view of an LCD panel in embodiment 1. As shown in FIG. 2, an LCD panel is provided and the LCD panel includes a display area 13, and a first signal line 5, a second signal line 6, a third signal line 7 and a fourth signal line 8 which are connected to the display area 13. The LCD panel further includes a TFT area; a first signal output port 9, a second signal output port 10, a third signal output port 11 and a fourth signal output port 12 are disposed on a side of the display area 13; the TFT area includes a first TFT unit 14, a second TFT unit 15, a third TFT unit 16, a fourth TFT unit 17 and a fifth TFT unit 18; and each of the first TFT unit and the fifth TFT unit includes one TFT, and each of the second TFT unit through the fourth TFT unit includes two TFTs, i.e., a first TFT and a second TFT.

Dotted lines in the first TFT unit 14 and the fifth TFT unit 18 represent subsequent connections in the same connection manner as corresponding connections in the second TFT unit 15, the third TFT unit 16 and the fourth TFT unit 17.

In the first TFT unit 14, a gate electrode of the TFT is connected to the first signal output port 9, and a source electrode of the TFT is connected to the first signal line 5.

In the second TFT unit, a gate electrode of the first TFT 15-1 is connected to the first signal output port 9, a source electrode of the first TFT 15-1 is connected to the second signal line 6, and a drain electrode of the first TFT 15-1 is connected to the second signal output port 10; and in the second TFT unit, a gate electrode of the second TFT 15-2 is connected to the second signal output port 10, a source electrode of the second TFT 15-2 is connected to the first signal line 5, and a drain electrode of the second TFT 15-2 is connected to the first signal output port 9.

In the third TFT unit, a gate electrode of the first TFT 16-1 is connected to the second signal output port 10, a source electrode of the first TFT 16-1 is connected to the third signal line 7, and a drain electrode of the first TFT 16-1 is connected to the third signal output port 11; and in the third TFT unit, a gate electrode of the second TFT 16-2 is connected to the third signal output port 11, a source electrode of the second TFT 16-2 is connected to the second signal line 6, and a drain electrode of the second TFT 16-2 is connected to the second signal output port 10.

In the fourth TFT unit, a gate electrode of the first TFT 17-1 is connected to the third signal output port 11, a source electrode of the first TFT 17-1 is connected to the fourth signal line 8, and a drain electrode of the first TFT 17-1 is connected to the fourth signal output port 12; and in the fourth TFT unit, a gate electrode of the second TFT 17-2 is connected to the fourth signal output port 12, a source electrode of the second TFT 17-2 is connected to the third signal line 7, and a drain electrode of the second TFT 17-2 is connected to the third signal output port 11.

In the fifth TFT unit 18, a gate electrode of the TFT is connected to the fourth signal output port 12, and a source electrode of the TFT is connected to the fourth signal line 8.

Further, the first GOA unit 1 is connected to the first signal line 5, and is connected to the first signal output port 9 through the display area 13.

The second GOA unit 2 is connected to the second signal line 6, and is connected to the second signal output port 10 through the display area 13.

The third GOA unit 3 is connected to the third signal line 7, and is connected to the third signal output port 11 through the display area 13.

The fourth GOA unit 4 is connected to the fourth signal line 8, and is connected to the fourth signal output port 12 through the display area 13.

Figure 3:
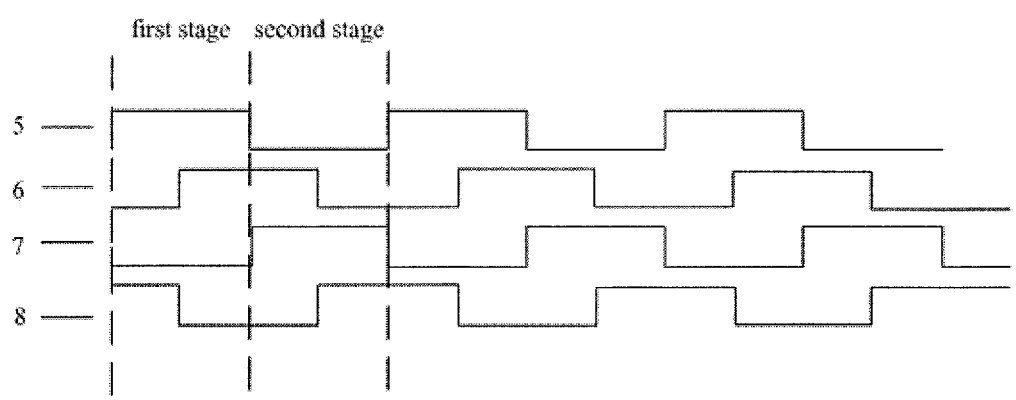
FIG. 3 is a waveform diagram of signal lines.

FIG. 3 is a waveform diagram of signal lines, i.e., the waveform diagram of the first signal line 5, the second signal line 6, the third signal line 7 and a fourth signal line 8. With respect to FIG. 3, a working principle of the LCD of the present disclosure is described as follows.

The first GOA unit 1 is connected to the first signal line 5, and is connected to the first signal output port 9 through the display area 13, and the first signal output port 9 is connected to the gate electrode of the first TFT 15-1 in the second TFT unit. Thus, the first GOA unit 1 is connected to the gate electrode of the first TFT 15-1 in the second TFT unit through the display area 13, the source electrode of the first TFT 15-1 in the second TFT unit is connected to the second signal line 6, and the drain electrode of first TFT 15-1 in the second TFT unit is connected to the second signal output port 10. Thus, at a middle time of a first stage for the first signal line 5, because the state is in high voltage, the first TFT 15-1 in the second TFT unit is turned on; and further, because the source electrode of the first TFT 15-1 in the second TFT unit is connected to the second signal line and the drain electrode of the first TFT is connected to the second signal output port 10, a signal transmitted by the second signal line 6 can be transmitted to the second signal output port 10 so as to form a signal output in this stage, and thus the delay of rising edge of the second signal output port can be reduced.

Similarly, the third GOA unit 3 is connected to the third signal line 7, and is connected to the third signal output port 11 through the display area 13, and the third signal output port 11 is connected to the gate electrode of the second TFT 16-2 in the third TFT unit. Thus, the third GOA unit 3 is connected to the gate electrode of the second TFT 16-2 in the third TFT unit through the display area 13; and the source electrode of the second TFT 16-2 in the third TFT unit is connected to the second signal line 6, and the drain electrode of second TFT 16-2 in the third TFT unit is connected to the second signal output port 10. Thus, at a middle time of a second stage for the second signal line 6, because this stage is in high voltage, the second TFT 16-2 in the third TFT unit is turned on and further, because the source electrode of the second TFT 16-2 in the third TFT unit is connected to the second signal line 6 and the drain electrode of the second TFT is connected to the second signal output port 10, a signal transmitted by the second signal line 6 can be transmitted to the second signal output port 10 to form a signal output, and thus the delay of falling edge of the second signal output port can be reduced.

According to the embodiments of the present disclosure, on the basis of not changing the current gate signal characteristics, the both-side gate drivers are improved, and thus the size of the gate drivers is reduced. Therefore, by adopting the inventive concept of the present disclosure, the effective area of the display area can be increased without changing the size of the substrate; or, in a case of a same effective display area, by adopting the inventive concept of the present disclosure, the size of the substrate can be reduced and a width of the bezel of the LCD panel can be reduced.

What is described above is merely some exemplary embodiments of the present disclosure, and is not intended to limit the scope of the present disclosure.

What is claimed is:

1. A liquid crystal display (LCD) panel comprising: a display area, and a first signal line, a second signal line through an $N^{th}$ signal line which are connected to the display area, wherein the LCD panel further comprises a thin film transistor (TFT) area; a first signal output port, a second signal output port through an $N^{th}$ signal output port are disposed at a side of the display area; the TFT area comprises a first TFT unit, a second TFT unit through an $(N+1)^{th}$ TFT unit; each of the first TFT unit and the $(N+1)^{th}$ TFT unit comprises one TFT, and each of the second TFT unit through an $N^{th}$ TFT unit comprises two TFTs which are a first TFT and a second TFT; wherein
in the first TFT unit, a gate electrode of the TFT is connected to the first signal output port, and a source electrode of the TFT is connected to the first signal line;
in the second TFT unit, a gate electrode of the first TFT is connected to the first signal output port, a source electrode of the first TFT is connected to the second signal line, and a drain electrode of the first TFT is connected to the second signal output port, the first TFT is configured for transmitting a signal transmitted by the second signal line to the second signal output port in response to a signal of the first signal output port; and in the second TFT unit, a gate electrode of the second TFT is connected to the second signal output port, a source electrode of the second TFT is connected to the first signal line, and a drain electrode of the second TFT is connected to the first signal output port, the second TFT is configured for transmitting a signal transmitted by the first signal line to the first signal output port in response to a signal of the second signal output port;
in the $N^{th}$ TFT unit, a gate electrode of the first TFT is connected to an $(N-1)^{th}$ signal output port, a source electrode of the first TFT is connected to the $N^{th}$ signal line, and a drain electrode of the first TFT is connected to the $N^{th}$ signal output port; and in the $N^{th}$ TFT unit, the first TFT is configured for transmitting a signal transmitted by the $N^{th}$ signal line to the $N^{th}$ signal output port in response to a signal of the $(N-1)^{th}$ signal output port; a gate electrode of the second TFT is connected to the $N^{th}$ signal output port, a source electrode of the second TFT is connected to the $(N-1)^{th}$ signal line, and a drain electrode of the second TFT is connected to the $(N-1)^{th}$ signal output port, the second TFT is configured for transmitting a signal transmitted by the $(N-1)^{th}$ signal line to the $(N-1)^{th}$ signal output port in response to a signal of the $N^{th}$ signal output port; and
in the $(N+1)^{th}$ TFT unit, a gate electrode of the TFT is connected to the $N^{th}$ signal output port, and a source electrode of the TFT is connected to the $N^{th}$ signal line.

2. The LCD panel according to claim 1, wherein the LCD panel further comprises a gate drive on array (GOA) region comprising a first GOA unit, and a second GOA unit through an $N^{th}$ GOA unit; wherein
the first GOA unit is connected to the first signal line, and is connected to the first signal output port through the display area;
the second GOA unit is connected to the second signal line, and is connected to the second signal output port through the display area; and
the $N^{th}$ GOA unit is connected to the $N^{th}$ signal line, and is connected to the $N^{th}$ signal output port through the display area.

3. A display device comprising an LCD panel according to claim 1.

4. The display device according to claim 3, wherein the LCD panel further comprises a gate drive on array (GOA) region comprising a first GOA unit, and a second GOA unit through an $N^{th}$ GOA unit; wherein
the first GOA unit is connected to the first signal line, and is connected to the first signal output port through the display area;
the second GOA unit is connected to the second signal line, and is connected to the second signal output port through the display area; and
the $N^{th}$ GOA unit is connected to the $N^{th}$ signal line, and is connected to the $N^{th}$ signal output port through the display area.

* * * * *